US 8,757,908 B2

(12) United States Patent
Wu et al.

(10) Patent No.: US 8,757,908 B2
(45) Date of Patent: Jun. 24, 2014

(54) FOLDABLE KEYBOARD

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 916 days.

(21) Appl. No.: 12/906,264

(22) Filed: Oct. 18, 2010

(65) Prior Publication Data

US 2011/0311289 A1     Dec. 22, 2011

(30) Foreign Application Priority Data

Jun. 18, 2010   (CN) .......................... 2010 1 0203438

(51) Int. Cl.
*G06F 3/02*     (2006.01)
*G09F 9/00*     (2006.01)
*G06F 3/14*     (2006.01)
*G06F 1/16*     (2006.01)

(52) U.S. Cl.
CPC ............ *G06F 3/0221* (2013.01); *G06F 3/1446* (2013.01); *G06F 1/1641* (2013.01); *G09G 2300/026* (2013.01)
USPC ............. 400/472; 400/680; 345/1.3; 345/168

(58) Field of Classification Search
CPC ...................................................... G06F 3/0221
USPC .................................. 400/472, 680; 206/721
See application file for complete search history.

(56) References Cited

U.S. PATENT DOCUMENTS

| 6,401,995 | B1 * | 6/2002 | Yuille et al. ................... 224/404 |
| 6,585,440 | B2 * | 7/2003 | Lin ............................... 400/681 |
| 7,061,752 | B1 * | 6/2006 | Lin et al. .................. 361/679.01 |
| 2003/0128502 | A1 * | 7/2003 | Chuang ......................... 361/680 |
| 2007/0008291 | A1 * | 1/2007 | Liu ............................... 345/168 |
| 2007/0285337 | A1 * | 12/2007 | Maddock ...................... 345/1.1 |
| 2011/0216064 | A1 * | 9/2011 | Dahl et al. .................... 345/428 |

FOREIGN PATENT DOCUMENTS

CN     2724074 Y     9/2005

* cited by examiner

*Primary Examiner* — Daniel J Colilla
(74) *Attorney, Agent, or Firm* — Novak Druce Connolly Bove + Quigg LLP

(57) ABSTRACT

A foldable keyboard includes a base, a receiving module, and connecting assemblies. The base includes a number of touch panel units. The receiving module includes a number of plates. The plates are pivotably connected to each other in series. The connecting assemblies are for biasing touch panel units into the folded configuration when the base is covered by the plates.

14 Claims, 10 Drawing Sheets

FOLDABLE KEYBOARD

BACKGROUND

1. Technical Field

The disclosure generally relates to keyboards and, particularly, to a foldable keyboard for an electronic device.

2. Description of Related Art

Portable electronic devices, such as personal digital assistants (PDAs), mobile phones, are widely used in our daily life. Keyboards are integrally formed in the portable electronic devices to input information. However, due to the limited dimensions of these integral keyboards, they usually include few buttons, or the buttons on the keyboards are very small. Thus, it can be inconvenient to input information for the electronic device.

Therefore, there is room for improvement within the art.

BRIEF DESCRIPTION OF THE DRAWINGS

Many aspects of the exemplary foldable keyboard can be better understood with reference to the following drawings. The components in the drawings are not necessarily drawn to scale, the emphasis instead being placed upon clearly illustrating the principles of the foldable keyboard. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
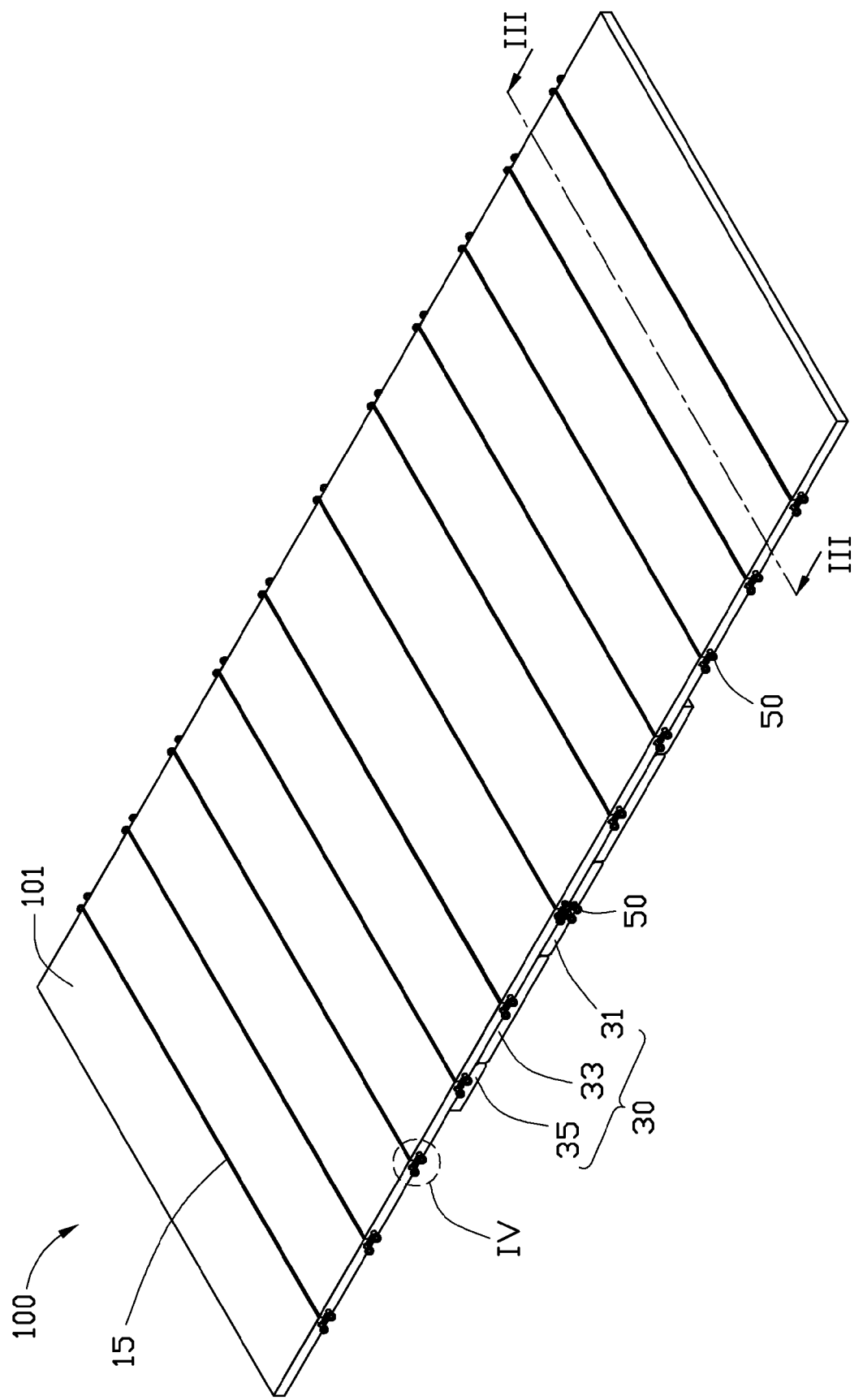
FIG. 1 is an isometric view of a foldable keyboard in an open state.
Figure 2:
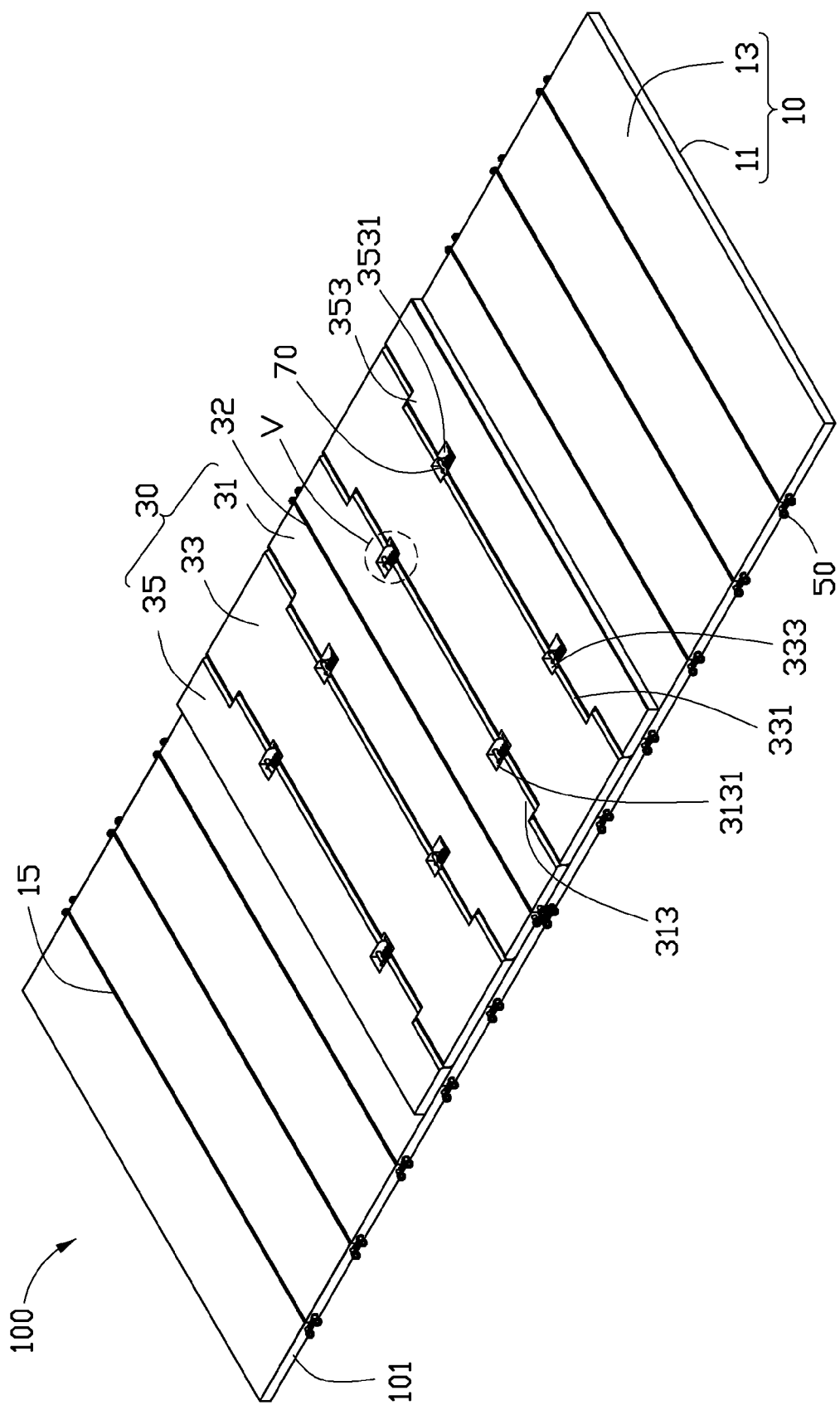
FIG. 2 is similar to FIG. 1, but viewed from another aspect.
Figure 9:
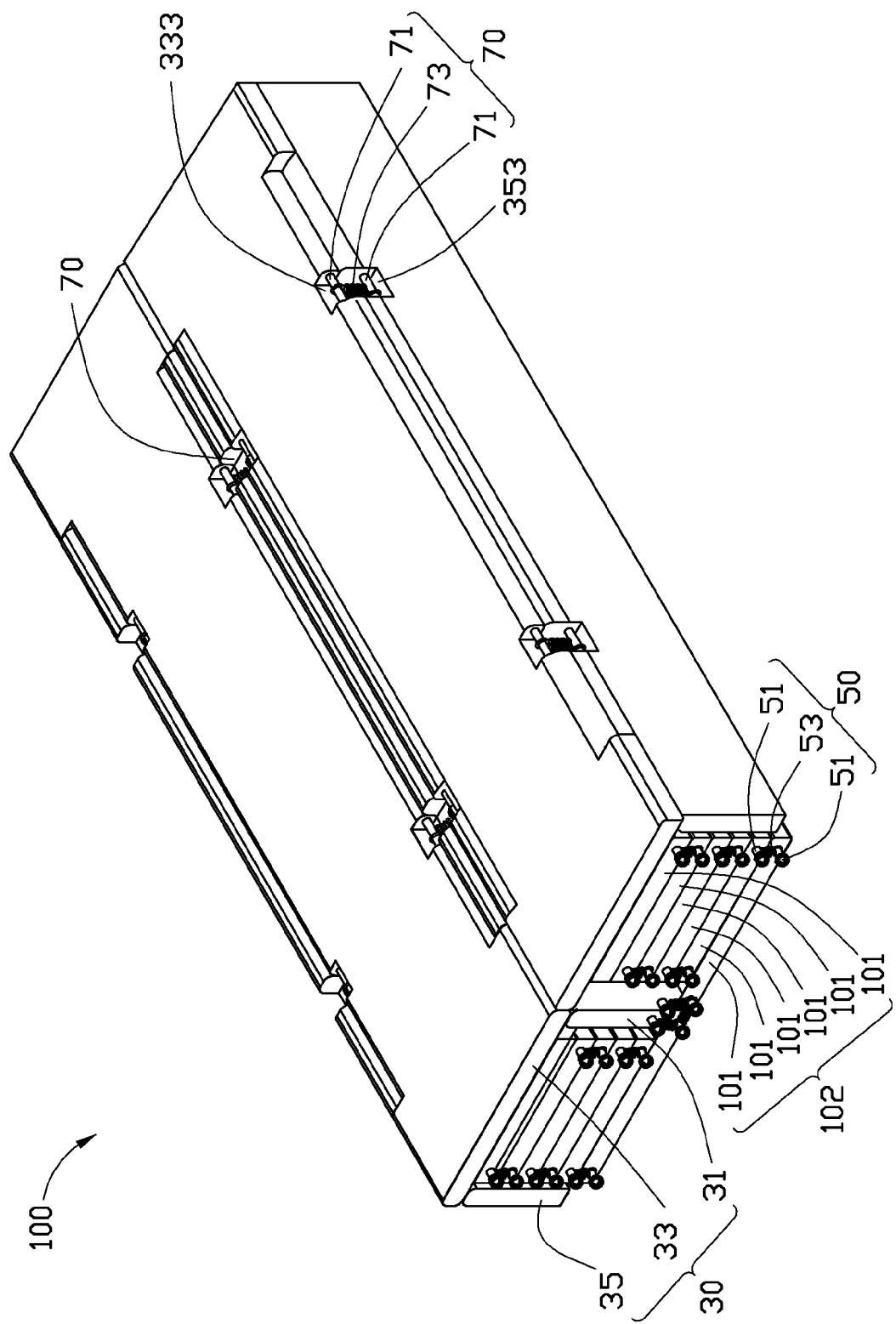
FIG. 9 is a view of the foldable keyboard of FIG. 1, but shown in a close state.
Figure 10:
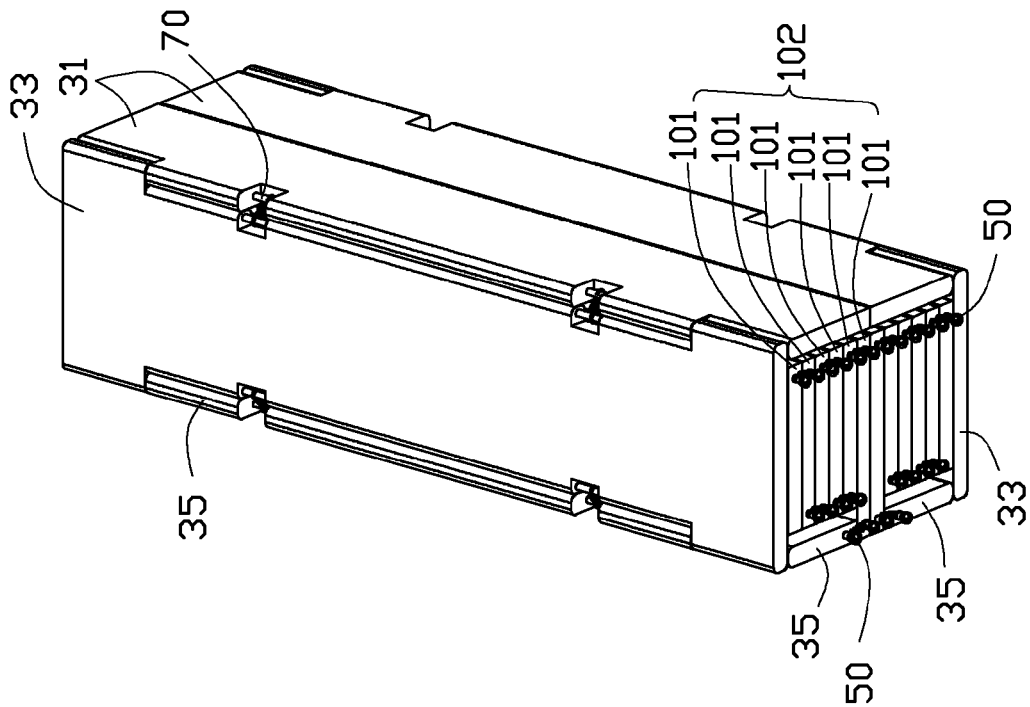
FIG. 10 is similar to FIG. 9, but showing in another close state.

FIGS. 1 and 2 illustrate a foldable keyboard 100. The keyboard 100 includes a base 10, two receiving modules 30, a plurality of first connecting assemblies 50, and a plurality of second connecting assemblies 70. Either receiving module 30 can be folded to receive and surround the base 10 (FIGS. 9-10). The first connecting assemblies 50 bias the base 10 into the folded configuration, and the second connecting assemblies 70 bias the receiving modules 30 into the folded configuration.

Figure 3:
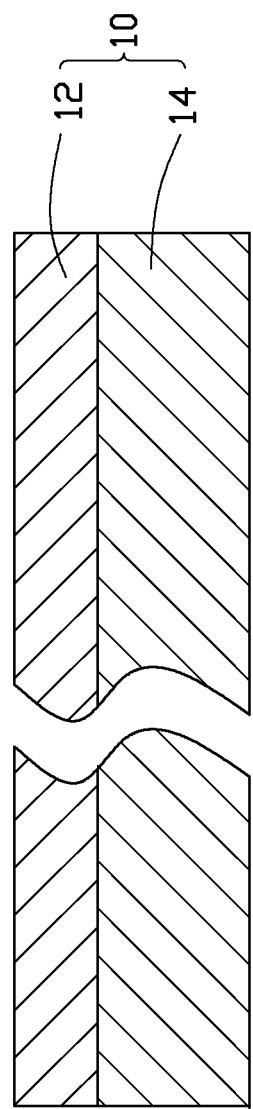
FIG. 3 is a cross section view of a base taken along line III-III of FIG. 1.

Referring to FIG. 3, the base 10 can be a touch panel, such as a capacitive touch screen or a resistance touch screen. The base 10 includes a base layer 14 and a touching layer 12 formed on the base layer 14. The base layer 14 may be made of silicon dioxide (SiO) or polyethylene terephthalate (PET). The touching layer 12 imbeds circuits formed by printing conductive ink. Thus, when the base 10 is touched by the user or a stylus (not shown), the keyboard 100 can input information for an electronic device (not shown) connected to the keyboard 100.

The base 10 is a touch panel and includes a plurality of touch panel units 101. A groove 15 is defined between every two adjacent touch panel units 101. Thus, the base 10 is easy to fold up.

Referring back to FIG. 2, each receiving module 30 includes a first plate 31, a second plate 33, and a third plate 35. The first plate 31 is pivotably connected to the base 10, the second plate 33 is pivotably connected to the first plate 31, and the third plate 35 is pivotably connected second plate 33. A connecting block 313 extends from one side of the first plate 31. Two spaced slots 3131 are defined in the connecting block 313. A connecting block 353 extends from one side of the third plate 35. Two spaced slots 3531 are defined in the connecting block 353. A cutout 331 and two spaced slots 333 are defined in each side of the second plate 33, the cutout 331 is for pivotably receiving the connect block 313 or 353. The slots 3131, 333 and 3531 are for accommodating the second connecting assemblies 70.

Figure 4:
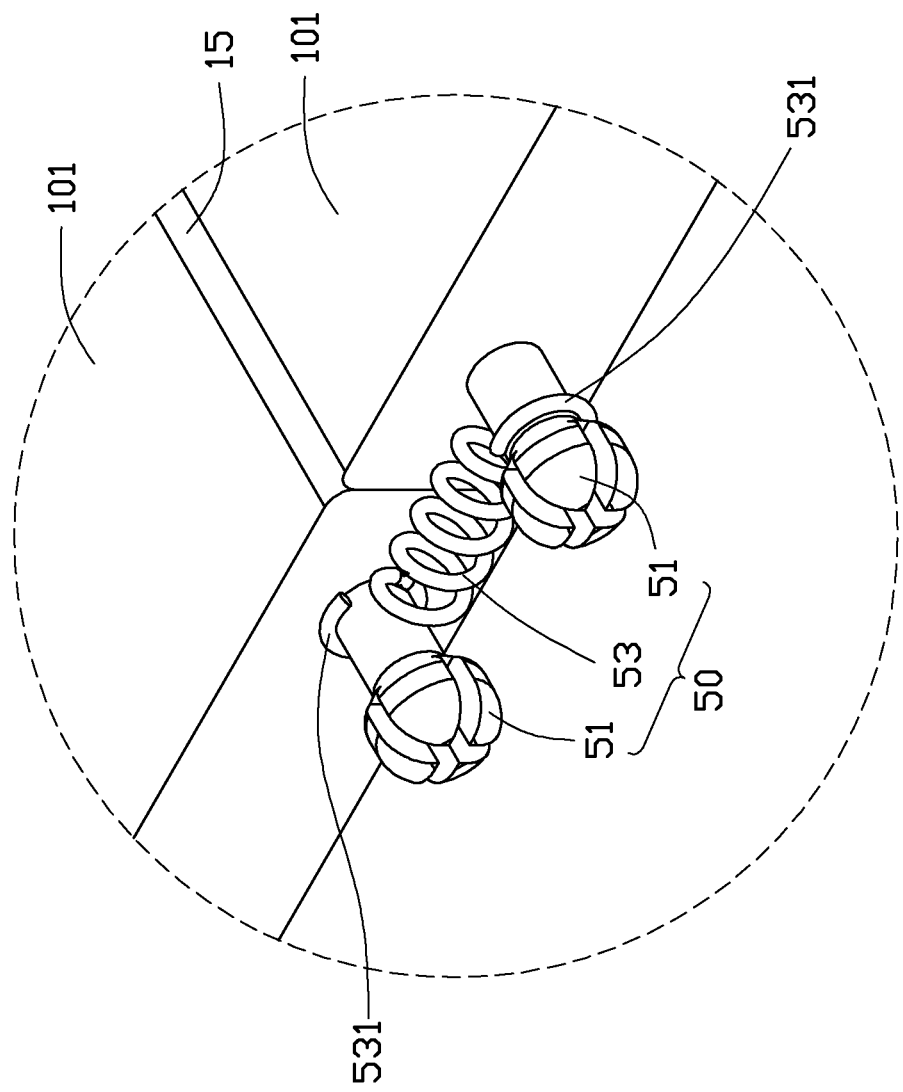
FIG. 4 is an enlarged view of a circled portion IV of FIG. 1.

Referring to FIG. 4, each first connecting assembly 50 includes two positioning posts 51 and an elastic element 53. In the exemplary embodiment, each positioning post 51 is a bolt and is secured to opposite surfaces of the base 10, and the elastic element 53 is a coiled spring with a hook 531 at each end thereof. Each hook 531 is fastened to a corresponding post 51. The adjacent touch panel units 101 may be elastically connected to each other at both the front and the back of the touch panel units 101 by two first connecting assemblies 50.

Figure 5:
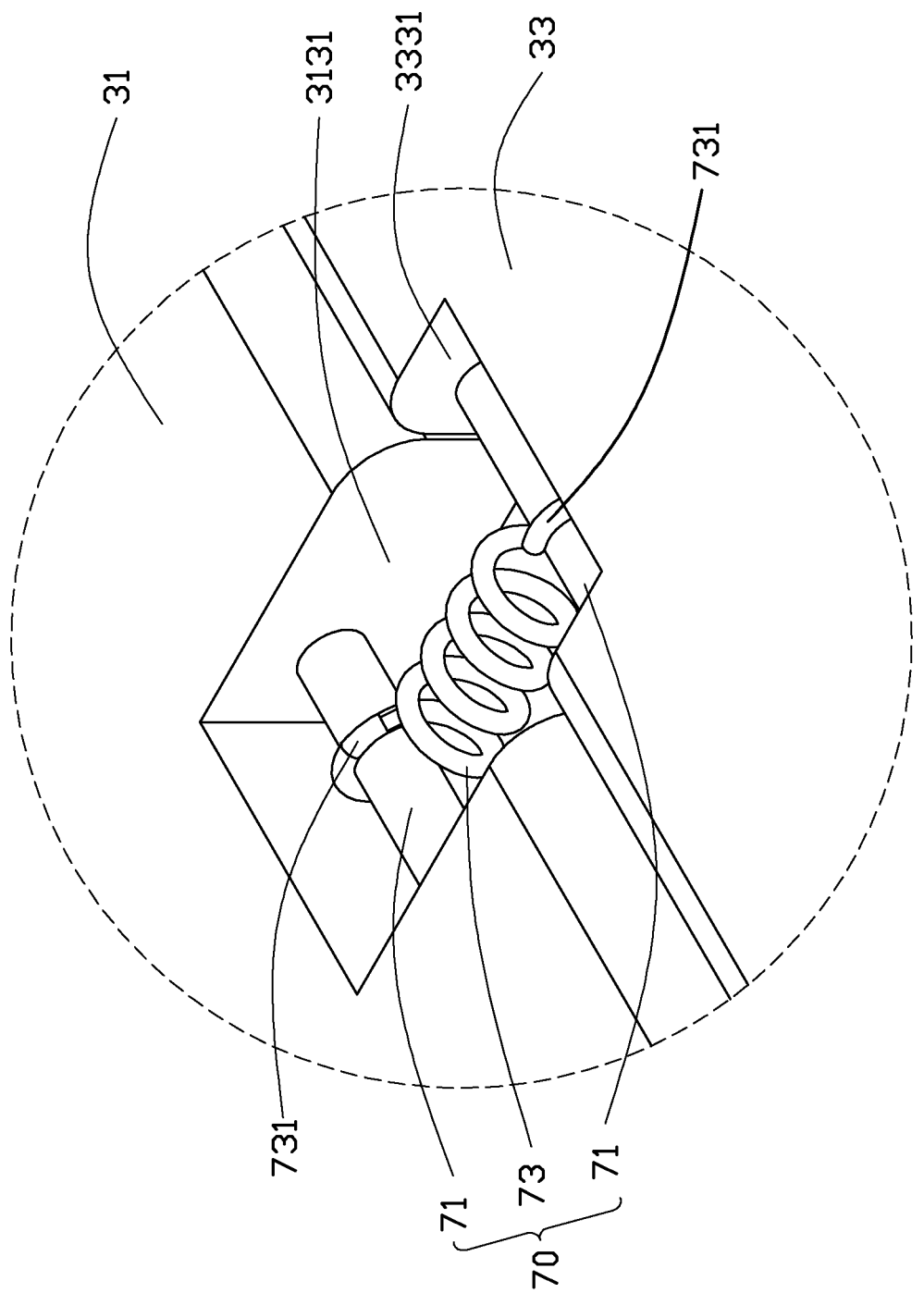
FIG. 5 is an enlarged view of a circled portion V of FIG. 2.

Referring to FIGS. 2 and 5, each second connecting assembly 70 includes two rods 71 and an elastic element 73. A rod 71 is received in each of the cutouts 3131, 333 and 3531 and is secured to the plate 31, 33 or 35. The elastic element 73 is a coiled spring with a hook 731 at each end thereof. Either hook 731 catches a corresponding rod 71. The plates 31, 33 or 35 may be elastically connected to each other at both the front and back of each plate by two second connecting assemblies 70.

During assembly, each first connecting assembly 50 is secured to the base 10. Every two positioning posts 51 are secured to a side of two adjacent touch panel units 101 and abut each other. One hook 531 of the elastic element 53 is placed on one of the positioning posts 51 and the other hook 531 is placed on the other positioning post 51. Similarly, the second connecting assemblies 70 are secured to the receiving modules 30. Finally, each receiving module 30 is secured to the base 10 by a first connecting assembly 50 as described before. Thus, the keyboard 100 is assembled, as shown in FIG. 2. When the keyboard 100 is assembled and in an open, usable state, the touch panel units 101 of the base 10 are substantially coplanar and the plates 31, 33 and 35 are substantially coplanar and are beneath the touch panel units 101 (see FIG. 1).

Figure 6:
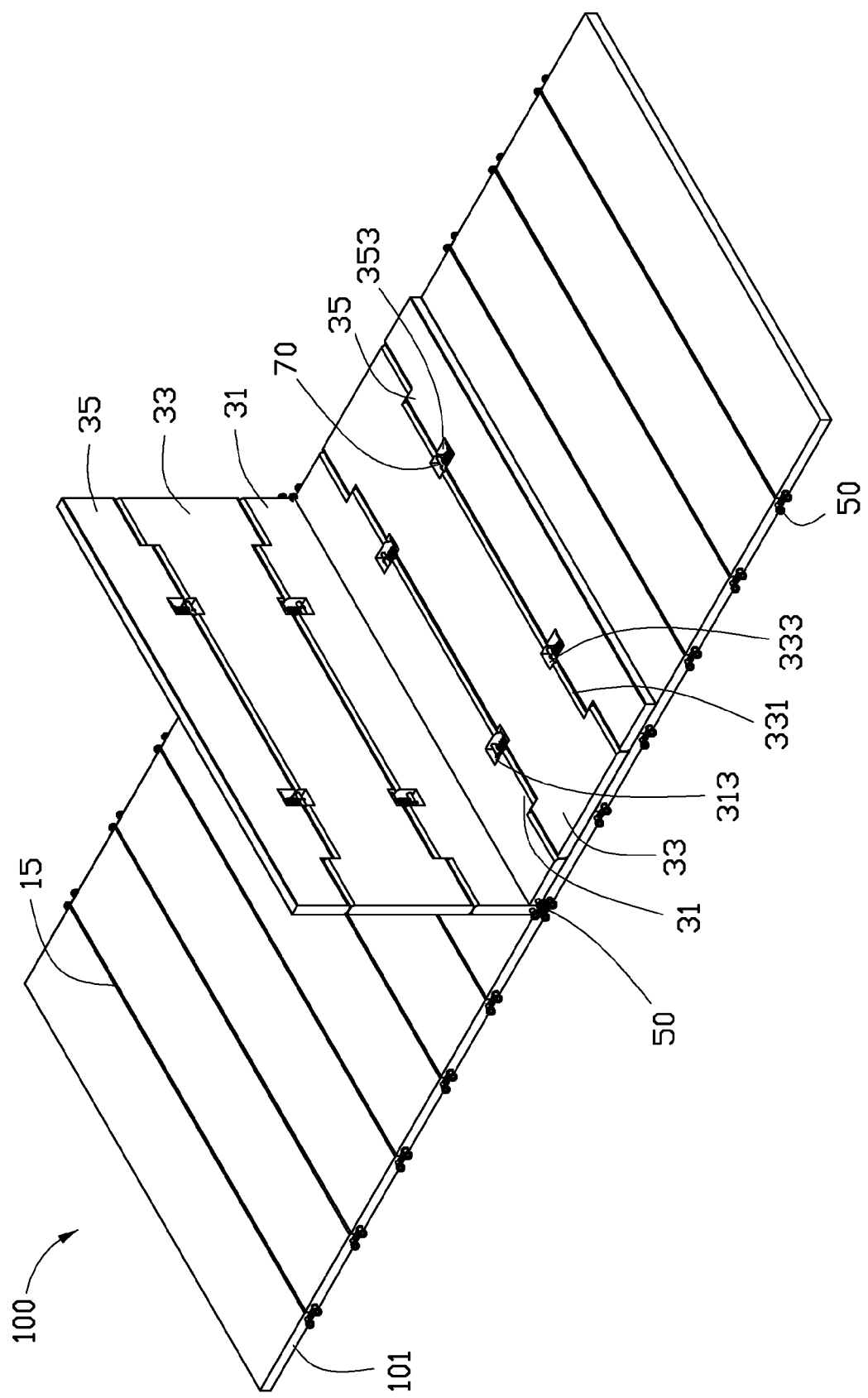
FIG. 6 is a view of a first step of folding the foldable keyboard.
Figure 7:
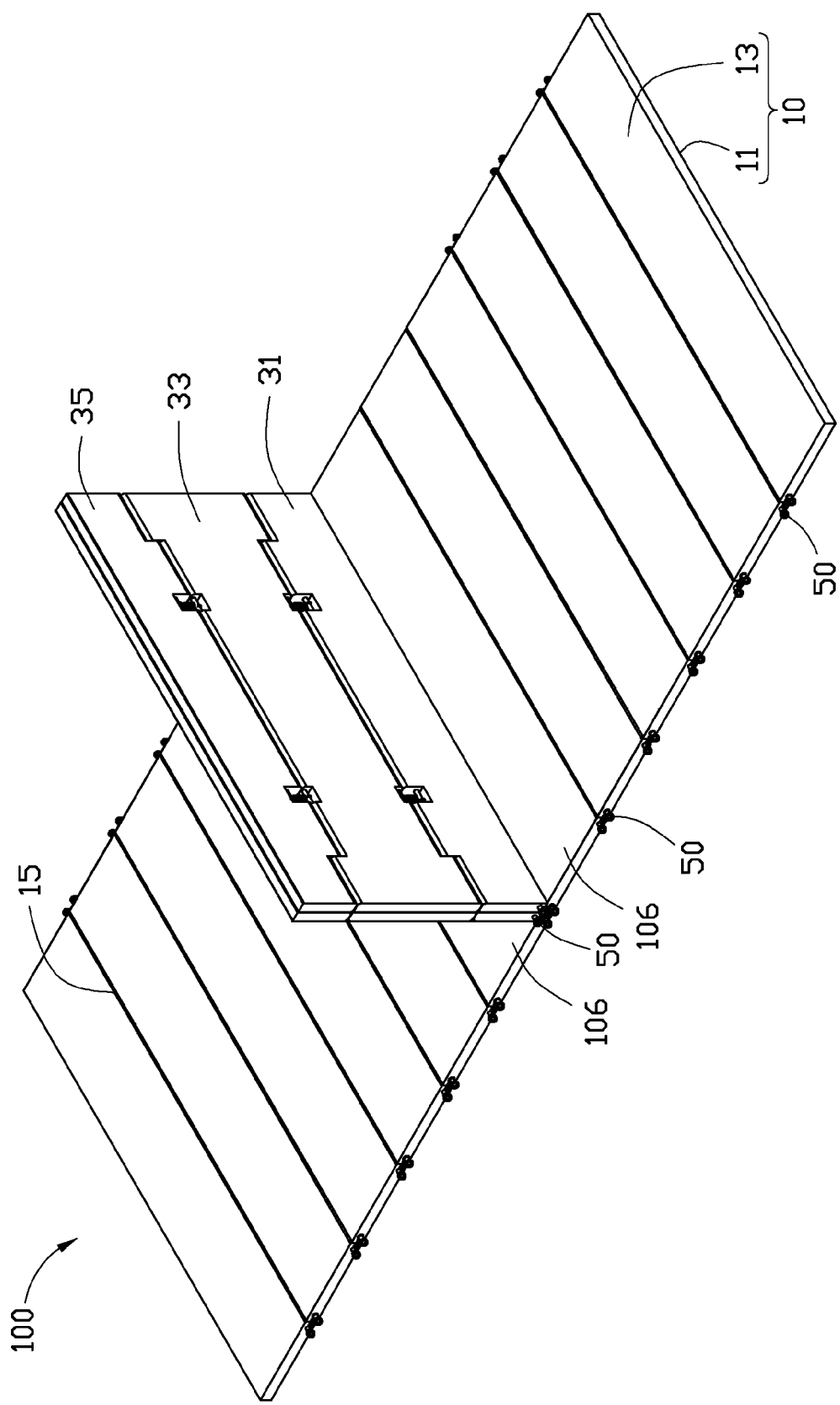
FIG. 7 is similar to FIG. 6, but showing a second step.

When the keyboard 100 is folded up to be stored or be carried, one of the receiving modules 30 is rotated 90 degrees by the user, thus the plates 31, 33 and 35 are perpendicularly oriented to the base 10, as shown in FIG. 6. When the receiving module 30 rotates, a distance between the post 51 secured to the base 10 and the corresponding post 51 secured to the first plate 31 decreases, and the elastic element 53 contracts and elastically places resistance against the base 10. Thus, the first plate 31 biases the receiving module 30 to stay perpendicular to the base 10. Similarly, the other receiving module 30 is rotated, as shown in FIG. 7.

Figure 8:
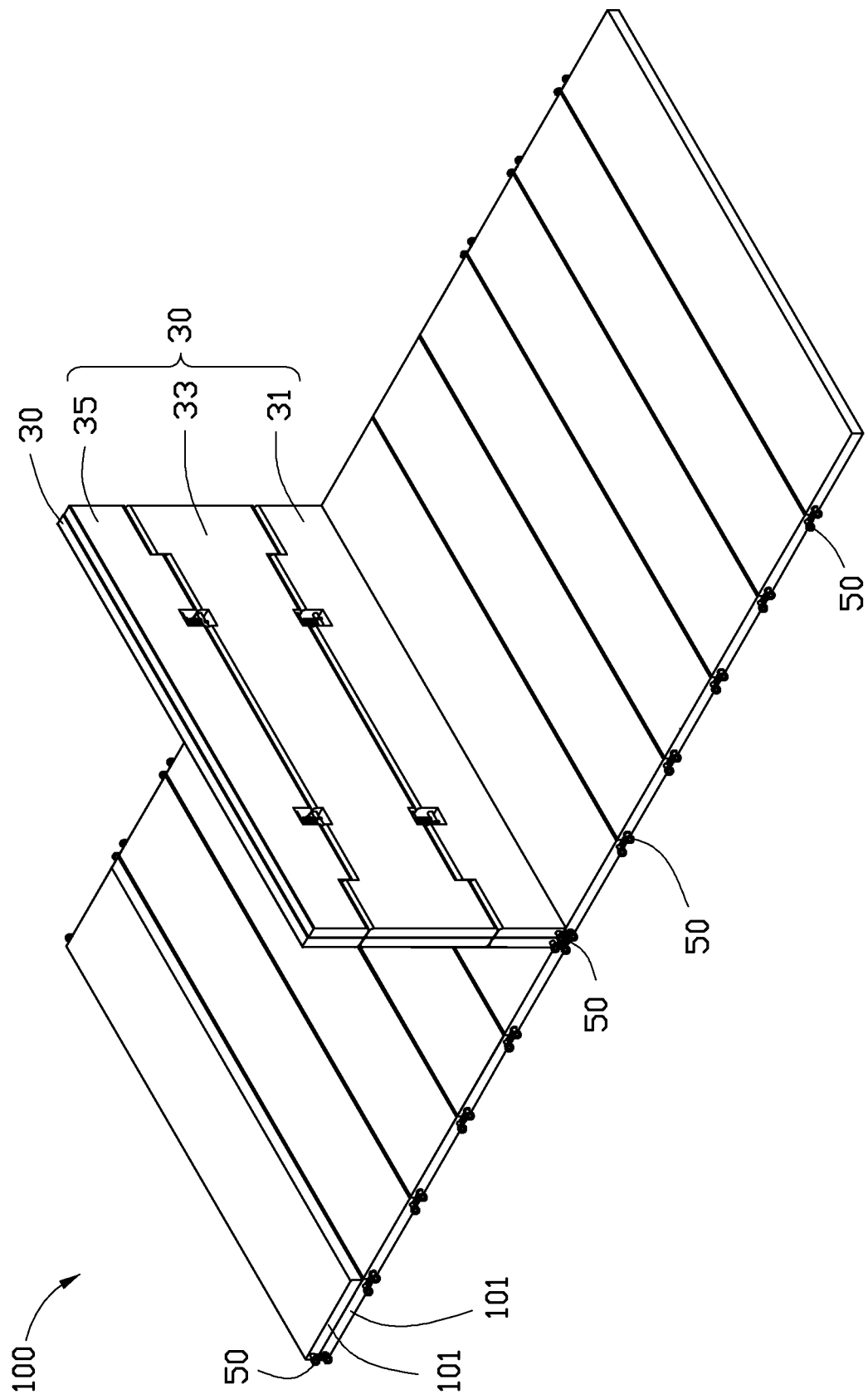
FIG. 8 is similar to FIG. 7, but showing another step.

Also referring to FIGS. 8 and 9, then, the touch panel units 101 on one side are stacked one on top of each other and form a stack 102. Then the second plate 33 is perpendicularly rotated relative to the first plate 31 and covers the stack 102. When the second plate 33 rotates, the distance between the rod 71 secured the first plate 31 and the rod 71 secured to the second plate 33 decreases, and the elastic element 73 contracts and elastically resists the base 10 and the first plate 31 to bias the second plate 33 to stay perpendicular to the first plate 31. Similarly, the third plate 35 is rotated and stays parallel to the first plate 31. Additionally, the other receiving module 30 is folded to receive the other touch panel units 101. Thus, the keyboard 100 is folded, as shown in FIG. 9.

The keyboard 100 can be further folded, as shown in FIG. 10. The touch panel units 101 are layered one on top of the other and are parallel to each other and form a stack 102, the base 10 is covered by the two receiving modules 30, and the plates 31, 33, and 35 cooperatively define a rectangular space.

The process of unfolding the keyboard 100 is substantially opposite to the process of folding as described above.

It is to be understood that the first connecting assembly 50 and the second connecting assembly 70 can be replaced by each other. The number of the receiving modules 30 can be varied, and the number of the plates can be increased or decreased.

The exemplary embodiments of the keyboards 100 can be folded and received in the receiving modules 30, thus, the keyboard 100 is easy to carry and clean.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A foldable keyboard comprising:
   a base including a plurality of touch panel units;
   a receiving module folded to receive and surround the base, the receiving module including a plurality of plates, the plates pivotably connected to each other in series;
   a plurality of connecting assemblies, the connecting assemblies biasing the touch panel units to stay stacked when the base is folded and covered by the plates;
   wherein each connecting assembly includes an elastic element and two positioning posts, the positioning posts of each connecting assembly are secured to an end of each touch panel unit that adjoins another touch panel unit of the plurality of touch panel units, each elastic element is secured to each of the two positioning posts of each connecting assembly, such that the elastic element deforms when the keyboard is folded.

2. The foldable keyboard as claimed of claim 1, further including a plurality of second connecting assemblies wherein two adjacent plates are connected by at least one connecting assembly of the plurality of second connecting assemblies.

3. The foldable keyboard as claimed of claim 1, wherein every two adjacent touch panel units of the plurality of touch panel units define a groove therebetween.

4. The foldable keyboard as claimed of claim 1, wherein the elastic element includes a hook at one end thereof, and each hook is placed on a corresponding positioning post.

5. The foldable keyboard as claimed of claim 1, wherein the plates cooperatively define a rectangular space, in which the stacked touch panel units are received.

6. A foldable keyboard comprising:
   a base including a plurality of touch panel units that can be folded and stacked in series;
   two receiving modules folded to receive and surround the base, each of the two receiving modules including a first plate, a second plate, and a third plate, the plates pivotably connected to each other in series;
   a plurality of connecting assemblies, the connecting assemblies biasing the touch panel units to stay in the folded and stacked configuration when the base is covered by the plates;
   wherein each connecting assembly includes an elastic element and two positioning posts, the positioning posts of each connecting assembly are secured to an end of each touch panel unit that adjoins another touch panel unit of the plurality of touch panel units, each elastic element is secured to each of the two positioning posts of each connecting assembly, such that the elastic element deforms when the keyboard is folded.

7. The foldable keyboard as claimed of claim 6, wherein a groove is defined between every two adjacent touch panel units of the plurality of touch panel units.

8. The foldable keyboard as claimed of claim 6, wherein the elastic element includes a hook one end thereof, and each hook is placed on a corresponding positioning posts.

9. The foldable keyboard as claimed of claim 6, wherein the two receiving modules cooperatively define a rectangular space, in which the stacked touch panel units are received.

10. The foldable keyboard as claimed of claim 6, wherein each of the first and third plate include a connecting block, and wherein a cutout is defined in opposite sides of the second plate, in which each of the connecting blocks are received, respectively.

11. A foldable keyboard comprising:
    a receiving module, the receiving module including a plurality of plates, the plates pivotably connected to each other in series;
    a base including a plurality of touch panel units, the touch panel units being foldable into a stack and being covered by the plates when the keyboard is in the folded and stacked configuration;
    a plurality of connecting assemblies, the connecting assemblies biasing the touch panel units to stay in the folded and stacked configuration when the base is covered by the plates;
    wherein each connecting assembly includes an elastic element and two positioning posts, the positioning posts of each connecting assembly are secured to an end of each touch panel unit that adjoins another touch panel unit of the plurality of touch panel units, each elastic element is secured to each of the two positioning posts of each connecting assembly, such that the elastic element deforms when the keyboard is folded.

12. The foldable keyboard as claimed of claim 11, wherein a groove is defined between every two adjacent touch panel units of the plurality of touch panel units.

13. The foldable keyboard as claimed of claim 11, wherein the elastic element includes a hook one end thereof, and each hook is placed on a corresponding positioning posts.

14. The foldable keyboard as claimed of claim 11, wherein the plates cooperatively define a rectangular space, in which the piled touch panel units are received.

* * * * *